Patented Dec. 8, 1942

2,304,471

UNITED STATES PATENT OFFICE 2,304,471

MANUFACTURE OF YEAST

Ejnar Alfred Meyer, Epsom, and Percival William Chaffe, Burgh Heath, England, assignors to Standard Brands Incorporated, New York, N. Y., a corporation of Delaware No Drawing. Application December 8, 1939, Serial No. 308,172. In Great Britain December 22, 1938

5 Claims. (Cl. 195—93)

The invention relates to the production of yeast. It is concerned more particularly with the manufacture of bakers' or pressed yeast by the aeration method, and includes correlated improvements and discoveries whereby such manufacture is enhanced.

It has been a practice previously to carry out a method for the production of yeast by operating for the entire period at the optimum temperature known for any given yeast, and also to work at that temperature until shortly before the end of the entire working period, and then to raise the temperature somewhat to improve the quality.

It is an object of the present invention to provide a method which leads to an increase in the yield of yeast from a given quantity of initial materials or wort.

A further object of the invention is to provide a procedure in accordance with which the yield of yeast may be increased without reducing the quality thereof.

An additional object of the invention is the provision of a method which increases the quality of the yeast produced and which may be readily, effectively and economically practiced.

A specific object of the invention is to provide a method for the production of yeast in which the temperature is held at a relatively high level, substantially the optimum for the yeast for a period, then lowered, and finally again raised.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the present process the raw material may be a diluted molasses or a grain wort, or a mixture thereof, which may be seeded by the addition of yeast, and the procedure continued under aeration. The method may be carried out as a straight set wort, i. e., with all the nutrient materials present initially, or in accordance with the additory or zulauf procedure. In the latter case the additions of nutrient material are made as required, and such comprises especially organic and/or inorganic nitrogen containing substances and phosphates which are yeast assimilable.

We have found that considerably increased yields can be obtained if the optimum temperature is maintained during only a fraction of the entire operating period after which the operation is carried on at a substantially reduced temperature which is then maintained to the end, or may be raised near the end. Hence, we have found that although the optimum temperature is beneficial during the initial stage, the total yield is improved if the temperature is dropped after the initial stage.

The rate at which the drop in temperature occurs, which may be fairly rapid, will depend on the facilities for and the economy in bringing about the reduction.

The initial somewhat high temperature, say 86° F., is maintained for a substantial fraction of the whole period, say about four hours out of a total period of 12 or 15 hours, and the continuing lower temperature is of the order of about ten degrees lower, say 75° F.

As an illustrative embodiment of a manner in which the method may be practiced, the following example is presented. A nutrient medium is prepared containing molasses as a carbohydrate material and suitable additions of nitrogen and phosphorus-containing nutrients, more especially ammonium salts and amino compounds, specifically ammonium sulfate, ammonium phosphates and the like. The temperature of the medium is then raised to about 86° F., and seeded with a suitable amount of yeast. Aeration of the mass may now be commenced and continued throughout the production period. The temperature of 86° F. is maintained for a period of four to five hours, and is followed by a lowering of the temperature to about 75° F., and held at such temperature for a period of about six hours. Finally, the temperature is again raised to about 86° F., and maintained for about two hours.

It will be realized that temperatures other than those just mentioned may be availed of, depending upon the character of the yeast, but as a general rule the lowering of the temperature is to a point which is about 10° below that at which the manufacture is initiated. It may be mentioned that in order to avoid external cooling, cold water may be added to the fermenter at the end of four hour warm period, and that less water, i. e., a more concentrated feed, may be used in the initial stage. As indicated above the amount of molasses and salts are those which are usual in a normal propagating process. We have found that a temperature of about 86° F. for the initial period, followed by a period at about 75° F., gives highly satisfactory results. This has led to an increase in yield of about 8 to 10%, and the keeping quality of the yeast is not affected.

If desired, the high temperature period followed by the relatively low temperature period may be repeated by establishing the high temperature for a second period and following it by a period at lower temperature.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A method for the production of yeast, which comprises preparing a nutrient medium containing yeast assimilable carbohydrate, nitrogen-containing and phosphorus-containing materials, seeding with yeast and propagating the yeast therein with aeration, said propagation being characterized by raising the temperature to and maintaining at about 86° F., and then dropping to a temperature of about 75° F.

2. A method for the production of yeast, which comprises preparing a nutrient medium containing yeast assimilable carbohydrate, nitrogen-containing and phosphorus-containing materials, seeding with yeast and propagating the yeast therein with aeration, said propagation being characterized by raising the temperature to and maintaining at about 86° F., then dropping to a temperature of about 75° F., and completing the propagation by again raising to and maintaining at said higher temperature.

3. A method for the production of yeast, which comprises preparing a nutrient medium containing yeast assimilable carbohydrate, nitrogen-containing and phosphorus-containing materials, seeding with yeast and propagating the yeast therein with aeration, said propagation being characterized by raising the temperature to and maintaining at about 86° F. during an initial period of several hours, and then dropping to a temperature of about 75° F. for a further period of several hours.

4. A method for the production of yeast, which comprises preparing a nutrient medium containing yeast assimilable carbohydrate, nitrogen-containing and phosphorus-containing materials, seeding with yeast and propagating the yeast therein with aeration, said propagation being characterized by raising the temperature to and maintaining at about 86° F. for a period of about four to five hours, and then dropping the temperature to about 75° F. for a further period of about six hours.

5. A method for the production of yeast, which comprises preparing a nutrient medium containing yeast assimilable carbohydrate, nitrogen-containing and phosphorus-containing materials, seeding with yeast and propagating the yeast therein with aeration, said propagation being characterized by raising the temperature to and maintaining at about 86° F. for a period of about four to five hours, then dropping the temperature to about 75° F. for a further period of about six hours, and completing the propagation by raising the temperature to about 86° F. and maintaining it for about two hours.

EJNAR ALFRED MEYER.
PERCIVAL WILLIAM CHAFFE.